Aug. 10, 1937.  A. ABRAMS ET AL  2,089,525
MACHINE FOR AND METHOD OF MAKING COATED SHEET MATERIAL
Filed Sept. 5, 1936
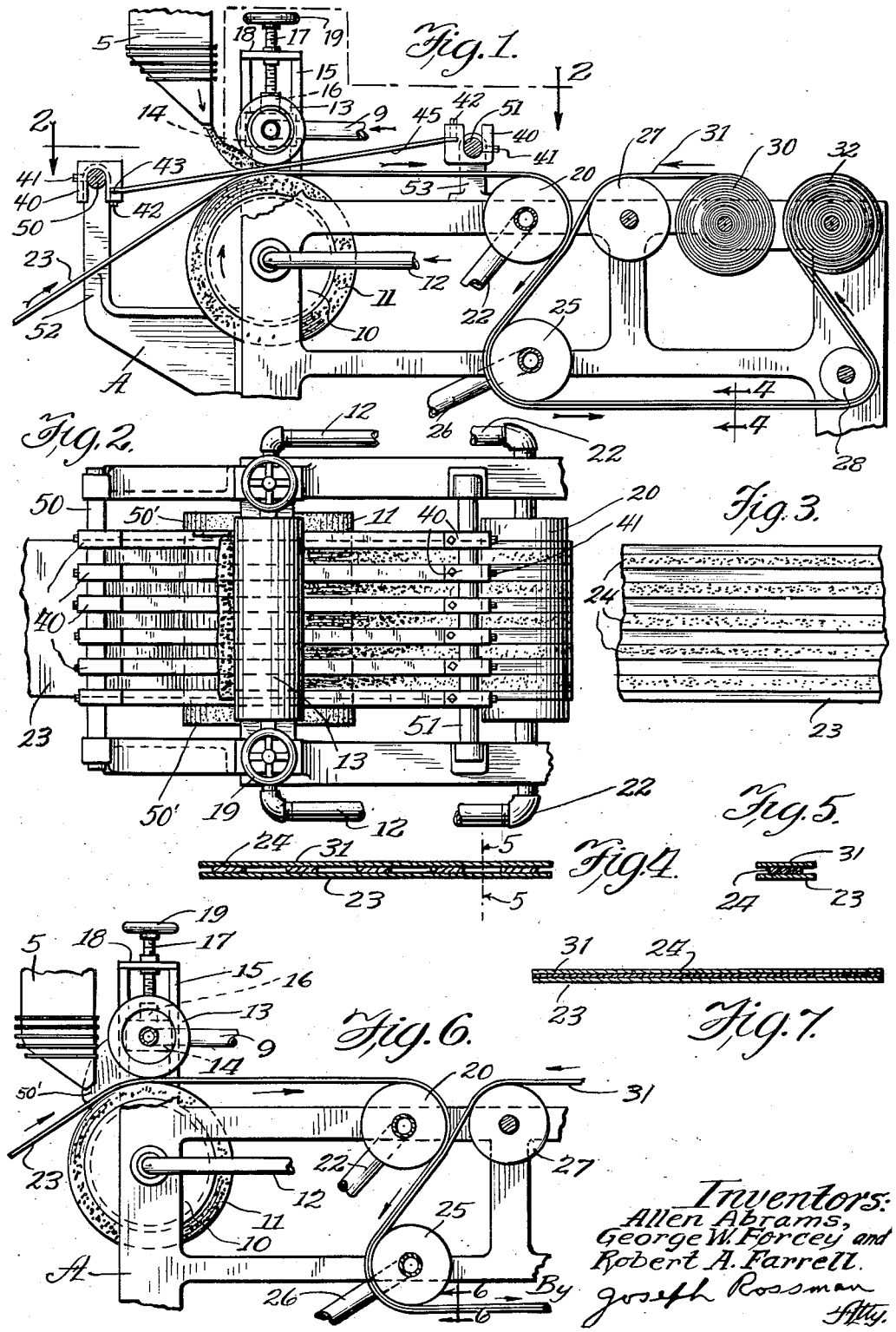

Patented Aug. 10, 1937

2,089,525

UNITED STATES PATENT OFFICE 2,089,525

MACHINE FOR AND METHOD OF MAKING COATED SHEET MATERIAL

Allen Abrams, George W. Forcey, and Robert A. Farrell, Wausau, Wis., assignors to Marathon Paper Mills Company, Rothschild, Wis., a corporation of Wisconsin Application September 5, 1936, Serial No. 99,648

6 Claims. (Cl. 91—12)

This invention relates to a machine for and to a method of making coated sheet material. More particularly the invention relates to the coating of paper and other sheet materials with thermoplastic compositions such as pressure sensitive adhesive compositions and also compositions comprising rubber or rubber-like, and a wax or wax-like substances and the like.

It is an important object of this invention to provide a machine for and method of coating sheet or web material with a thermoplastic coating composition by applying the thermoplastic composition in molten condition and then congealing the same.

It is a further object of this invention to provide a machine for the coating of web or sheet material with a hot, relatively viscous thermoplastic composition by employing a heated spreading means and chilling the coating.

It is a further object of this invention to provide a method of continuously coating sheet or web material with longitudinal stripes of hot thermoplastic compositions.

Other and further important objects of this invention will become apparent from the following specification and the accompanying drawing.

On the drawing:

Figure 1 represents a partly diagrammatic side elevational view of a coating machine embodying the principles of our invention, with the forward bearing block and side dam removed.

Figure 2 is a fragmental plan view of the machine shown in Figure 1.

Figure 3 is a fragmental plan view of the coated web before the liner is applied thereto.

Figure 4 is a cross-sectional view of the coated web with the liner applied thereto taken on lines 4—4 of Figure 1.

Figure 5 is a cross-sectional view of one of the strips cut on lines 5—5 of Figure 4.

Figure 6 represents a partly diagrammatic side elevational view of a modified form of coating machine, with the forward bearing block removed.

Figure 7 is a cross-sectional view of the coated web taken on lines 7—7 of Figure 6.

As shown on the drawing:

In Figure 1, the reference numeral 10 indicates a roll having a surface layer or covering 11 of resilient material, such as a rubber composition or the like. Said roll 10 is provided at its ends with pipes 12 for the circulation therethrough of a heating fluid, such as steam.

A doctor roll 13 having suitable piping connections 9 for circulating therethrough a heating fluid, is mounted above the roll 10 with its axis parallel thereto and with its journals supported in bearing blocks 14 that are adjustably held within guide members 15. Said bearing blocks 14 are provided with internally threaded bosses 16 into which extend the threaded ends of adjusting screws 17 for varying the distance between the surfaces of the doctor roll 13 and the cooperating roll 10. The screws 17 are rotatably held in cross members 18 mounted on the guiding members 15. To facilitate the adjustment of the doctor roll 13, the screws 17 are provided with manually operable wheels 19. It will be understood, however, that any conventional construction can be used for effecting the adjustability of the doctor roll 13 with respect to the cooperating roll 10.

Chill roll 20 is positioned so as to receive the coated web after leaving the surface of the roll 10. Suitable piping connections 22 permit the circulation of a cooling fluid, such as water or brine, through the hollow roll 20.

An idler roll 27 is spaced away from roll 20 for guiding a liner web 31 supplied from roll 30 into light contact with the coated web. Roll 25 is a chilled guide roll having suitable piping connections 26 for the circulation of a cooling fluid therethrough. The combined webs are led over rolls 25 and idler roll 28 and wound up on roll 32.

At the forward end of the frame A a standard 52 supports a fixed shaft 50 which carries thereon a series of spaced U-shaped blocks 40. Another standard 53 on the frame is positioned behind the rolls 10 and 13 for supporting a fixed shaft 51 which also carries thereon a series of U-shaped blocks 40. Blocks 40 are provided with set screws 41 for adjustably positioning the blocks on the supporting shafts 50 and 51. Each block is also provided with a slot 43 for receiving the end of a flexible thin metal strip 45. Each of the ends of the strips 45 are secured to the blocks 40 by means of set screws 42. The metal strips 45 are positioned so as to be taut and to contact roll 11 in tangential relation as shown in Figure 1.

The width of strips 45 determines the width of the spaces between the stripes of thermoplastic composition which it is desired to apply to the web material 23. The number of metal strips employed is also determined by the width of the web 23 to be coated. It is also obvious that the thickness of the metal strips 45 determines the thickness of the coating which will be applied to the web as the doctor roll is positioned during the coating operation so as to rest on the metal strips 45 as shown in Figure 1.

It is obvious that instead of employing individually positioned metal strips the strips may be permanently fastened at their ends to a suitable frame so that they may be removable as a unit. It is also obvious that a metal sheet or a sheet of any other suitable material of the requisite thickness may be employed, such sheet being provided with cut-out areas so as to permit the composition to pass therethrough upon the web beneath so as to form stripes of coating of any desired contour.

The means herein disclosed for applying stripes of composition to a backing thus constitute spaced feeding means of suitable width through which the hot thermoplastic composition is forced or fed onto the web traveling beneath and in contact with said means.

In starting up the machine such as shown in Figure 1, a web of sheet material 23 is led beneath the metal strips 45 and between the roll 10 and the doctor roll 13 and then the coated web is passed around the chilled roll 20. A mass of the coating composition, in a heated plastic state supplied from steam jacketed hopper 5, is positioned on the traveling web 23 and on the metal strips 45 in advance of the doctor roll 13 and the doctor roll 13 is so adjusted as to rest on the metal strips thereby controlling the thickness of coating to the web as it travels through the nip between the two rolls. End walls or dams 50' are positioned at the ends of the rolls to retain the coating composition therebetween.

Since both the roll 10 and the doctor roll 13 are heated to a suitable temperature, preferably to a temperature of around 180 to 200° F. when using the thermoplastic compositions hereinafter described, the plastic mass 24 is maintained in a sufficiently plastic condition to be drawn into the nip between the doctor roll 13 and the cooperating roll 10. We have found that it is preferable to revolve the doctor roll 13 in the same direction as the roll 10 but at a speed considerably slower than that of the roll 10. If the doctor roll travels too fast in relation to the large roll, the coating is not smooth and uniform. Very satisfactory results are obtained if the surface speed of the doctor roll is equivalent to only about 4% of the surface speed of the large roll 10. One of the objects of having the doctor roll revolve is that otherwise small lumps or specks of dirt may collect between the doctor roll and the cooperating roll. If the doctor roll were not turning, these lumps of particles and dirt would remain in situ, thereby causing the coating to streak or tear at such point. If, however, the doctor roll turns, the wiping action is sufficient to keep such dirt or lumps moving along with the film.

The chilled roll 20 is placed in close proximity to the roll 10 so that the coated web 21 is chilled after it leaves the coating roller 10.

The web 23 is coated by the method herein disclosed with spaced longitudinal stripes 24 of the composition. As shown in Figures 3 and 4 the stripes 24 are of uniform thickness and have sharp clean cut margins throughout. The coated web is then cut between the stripes of coating as shown at 5—5 in Figure 4, to produce a narrow tape with uncoated margins as shown in Figure 5.

When a pressure sensitive composition is coated on the web it is desirable to protect the coating by applying a peelable liner thereto such as of glassine, holland cloth and the like. The liner 31 is passed over the idler roll 27 and brought lightly into contact with the adhesive coating. Thus the liner is not in contact with the composition under simultaneous heat and pressure, and hence does not stick too much to the coating. The combined webs are then passed over chilled roll 25 to further congeal the coating and then over an idler roll 28 and wound up on roll 32.

Our apparatus may also be utilized for coating the entire surface of a web by dispensing with the metal strips 45. Figure 6 illustrates the same machine as shown in Figure 1 except that the metal strips have been removed. The doctor roll 13 is so adjusted as to give the desired thickness of coating to the web as it travels through the nip between the two rolls 13 and 10. The coated web 23 having a layer of adhesive 24 thereon protected by a cover strip is shown in Figure 7.

Our machine and method is adapted for coating sheet materials with numerous types of thermoplastic compositions. The apparatus herein disclosed is particularly adapted for coating paper and the like with thermoplastic pressure sensitive compositions such as are disclosed in copending application Serial No. 98,978 filed September 1, 1936.

A typical example of such composition suitable for coating paper has the following constituents:

| | Per cent by weight |
|---|---|
| Rubber | 30 |
| Amorphous paraffin wax (m. p. 155° F.) | 19 |
| Methyl abietate | 25 |
| Glycerine | 0.5 |
| Hydroquinone | 0.5 |
| Ester gum | 25 |

In preparing this composition the ester gum and methyl abietate are preferably melted in a mechanical mixer and heated to a temperature of about 210° F. The rubber is then added and the temperature permitted to drop to about 180° F. and the mix stirred at this temperature for about 1½ hrs. until it is smooth and homogeneous. The hot composition is then ready to be coated on any suitable base.

Our machine is also adapted for coating thermoplastic compositions comprising rubber-like and wax-like substances as disclosed in Patent No. 2,054,112 September 15, 1936.

Suitable rubber and rubber-like substances include pale crepe rubber, smoked sheet rubber, vulcanizable rubbers generally gutta percha, synthetic rubber, and rubber-like gummy substances such as Vispronal. We have successfully used paraffin wax, bleached beeswax, spermaceti and other waxes, in the preparation of our composition. However, pale crepe rubber and paraffin wax are the ingredients which we prefer to use in the coating of sheet or web material.

The proportion of pale crepe rubber to paraffin wax may, in general, vary between 6% rubber, 94% paraffin wax and 30% rubber, 70% paraffin wax by weight. Using other rubber-like and wax-like substances, the proportion should be so chosen as to give suitable viscosities so that the coating composition does not strike through the sheet being coated.

The following will illustrate a preferred composition and a preferred method of preparing the composition:

| | Per cent by weight |
|---|---|
| Paraffin wax, melting point between 120 and 140° F | 85 to 88 |
| Pale crepe rubber sheets, 0.020 to 0.050 inch in thickness | 15 to 12 |

The paraffin wax is melted by heating in a jacketed vessel, preferably provided with a kneader type of stirrer, to a temperature of about 200–210° F. The thin rubber sheets are then added so that their surfaces are completely wetted with the molten paraffin wax. During the addition of the rubber, the temperature is maintained at about 180–190° F. The bath is then gently stirred for about fifteen minutes with a paddle until the sheets are thoroughly penetrated with the paraffin wax. The mixture is then stirred in a kneader type of mixer for about 1½ to 2 hours at a temperature of 180 to 190° F. until a smooth homogeneous mass is obtained.

Various pigments or other coloring matters, fillers, and the like, may be incorporated, either directly or by means of a master batch, into the rubber-wax mixture, depending upon the type of pigment, filler, or added ingredients to be incorporated. It is also possible by means of split batches to prepare vulcanizable coating compositions that will become vulcanized after being coated onto the sheet or web material, as described in Patent 2,054,115 September 15, 1936.

It will be understood that the apparatus and method herein disclosed as generally applicable to the coating of any web material such as paper, fabric board, metal foil, sheet materials made from synthetically produced substances such as viscose, cellulose acetate, resins, and the like, with any thermoplastic composition which can be spread by heating same to a suitable temperature. Our method is particularly adapted to the coating of web material with compositions which are highly viscous and sticky in heated condition thereby eliminating the use of volatile solvents.

We are aware that many changes may be made and numerous details of construction may be varied through a wide range without departing from the principles of this invention, and we, therefore, do not purpose limiting the patent granted hereon otherwise than necessitated by the prior art.

We claim:

1. A machine for coating web material with a thermoplastic coating composition, which comprises a rubber covered roll, means for heating said roll, a cooperating heated doctor roll, means for driving said doctor roll at a slower speed than said first roll but with the cooperating surfaces of said rolls moving in the same direction, means for adjustably positioning said doctor roll with respect to said first roll, spaced strips of sheet metal positioned between said rolls to control the thickness and spacing of the stripes of the coating applied to said web ahead of said doctor roll from a mass of said coating composition as said web passes between said rolls, and a chilled roll around which said coated web is passed after leaving said first roll.

2. The method of coating web material with stripes of a thermoplastic coating composition, which comprises applying the coating composition in a heated plastic condition to the web material through spaced openings while supported on a rotating surface, controlling the thickness of the coating so applied by a second surface rotated in close proximity to said first surface moving in the same direction at a slower speed and chilling said coated web material.

3. The method of coating web material with stripes of a thermoplastic coating composition, which comprises applying the coating composition in a heated plastic condition to the web material through spaced openings while supported on a rotating surface, controlling the thickness of the coating so applied by a second surface rotated in close proximity to said first surface and moving in the same direction but at a different speed, and chilling said coated web material.

4. The method of coating web material with stripes of a thermoplastic coating composition, which comprises applying the coating composition in a heated plastic condition to the web material through spaced openings while supported on a rotating surface, controlling the thickness of the coating so applied by a second heated surface rotated in close proximity to said first surface and moving in the same direction but at a different speed, and chilling said coated web material.

5. The method of coating web material with a pressure sensitive composition comprising a cohesive agent, an adhesive agent and a thermoplastic solvent for same, which comprises applying a heated plastic mass of the said composition to the web material through spaced openings while the latter is supported on a resilient heated surface, rotating said surface in close proximity to a second heated surface, rotating said surface at a slower speed but in the same direction, adjusting the distance between said heated surfaces to control the thickness of the coating adhering to said web material and chilling said heated web material.

6. A machine for coating web material with a thermoplastic coating composition, which comprises a resiliently covered roll, means for heating said roll, a cooperating heated doctor roll, means for driving said doctor roll at a slower speed than said first roll but with the cooperating surfaces of said rolls moving in the same direction, means for adjustably positioning said doctor roll with respect to said first roll, an integral body provided with a plurality of spaced parallel longitudinally extending members so as to form spaced openings therebetween, said body being positioned between said rolls to control the thickness and spacing of the stripes of the coating applied to said web ahead of said doctor roll from a mass of said coating composition as said web passes between said rolls, and a chilled roll around which said coated web is passed after leaving said first roll.

ALLEN ABRAMS.
GEORGE W. FORCEY.
ROBERT A. FARRELL.